May 9, 1950 E. H. HUGENHOLTZ ET AL 2,507,160

DIVERSITY RECEIVING SYSTEM

Filed Feb. 11, 1947 2 Sheets-Sheet 1

E. H. HUGENHOLTZ & J. M. OLTHUIS
INVENTORS
BY [signature]
AGENT

E. H. HUGENHOLTZ & J. M. OLTHUIS
INVENTORS
BY Fred M Vogel
AGENT

Patented May 9, 1950

2,507,160

UNITED STATES PATENT OFFICE 2,507,160

DIVERSITY RECEIVING SYSTEM

Eduard Herman Hugenholtz and Jan Maximiliaan Olthuis, Eindhoven, Netherlands, assignors to Hartford National Bank and Trust Company, Hartford, Conn., as trustee Application February 11, 1947, Serial No. 727,920
In the Netherlands June 16, 1944

Section 1, Public Law 690, August 8, 1946
Patent expires June 16, 1964

3 Claims. (Cl. 250—6)

Figure 1:
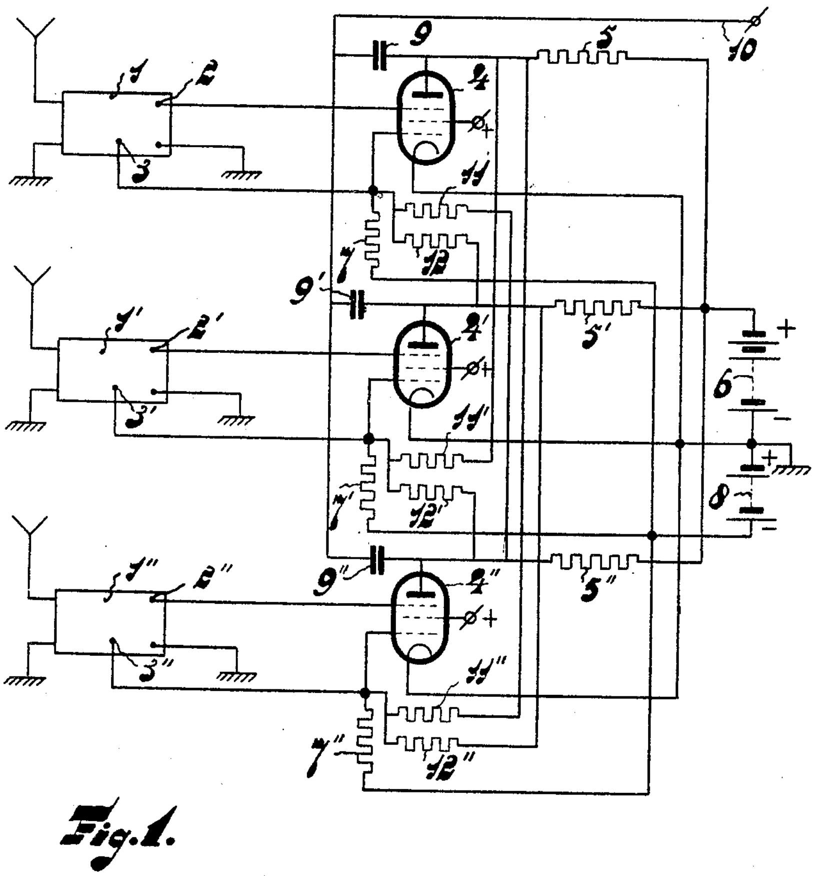

This invention relates to a circuit arrangement for the transmission of an electric signal having a definite property, which signal must be selected from a certain number of electric signals.

For the purpose of decreasing or obviating variations in strength brought about by fading in the reception of radio signals, it is known to utilise a receiving device in which signals originating from the same transmitter are received at a plurality of points of reception located at some distance from one another and are supplied to a central point in which the signal which is least subject to fading is selected.

This selection takes place by comparison of voltages each of which is a measure of the strength of the various signals received. From this comparison results a voltage which keeps open only that receiving channel in which the signal is amplified which is least subject to fading.

The present invention which also relates to receiving devices of the said kind provides a circuit arrangement which exhibits a considerable simplification relatively to circuits of the known type. This simplification is based on the recognition of the fact that it is possible for the system which selects the signal having the desired property to be combined with the system which controls the transmission by and the blocking of the receiving channels.

According to the invention, to this end each of the signals from which the signal having the desired property must be selected, is supplied for transmission to a discharge system, which discharge systems are each controlled also by a voltage dependent on the occurrence of the said property in the signal to be transferred by the system concerned and which discharge systems are controlled and are mutually coupled in such manner that the transmission is effected solely by the discharge system which has the signal of the desired property supplied to it and that the transmission through the other transmission systems is blocked.

The discharge systems are preferably coupled to one another in such manner that each system has two stable positions of equilibrium one of which is selected as a function of the value and/or the direction of the control voltage.

Such a coupling may be obtained, for example, by connecting a current-conveying electrode, for example the anode, of each of the discharge systems, via resistances, to a control electrode of each of the other discharge systems.

In many cases the value of the control voltage of each system is dependent on the extent to which the said property occurs in the signal to be transmitted by the system concerned. Use may also be made as such of the differences between voltages the value of which is a measure of the occurrence of the said property in each of the various signals.

The invention is more particularly applicable to the receiving devices previously referred to, in which signals originating from the same source, for example from the same transmitter, are received at points of reception located at some distance from one another and from which the signal which is least subject to fading is selected.

Figure 2:
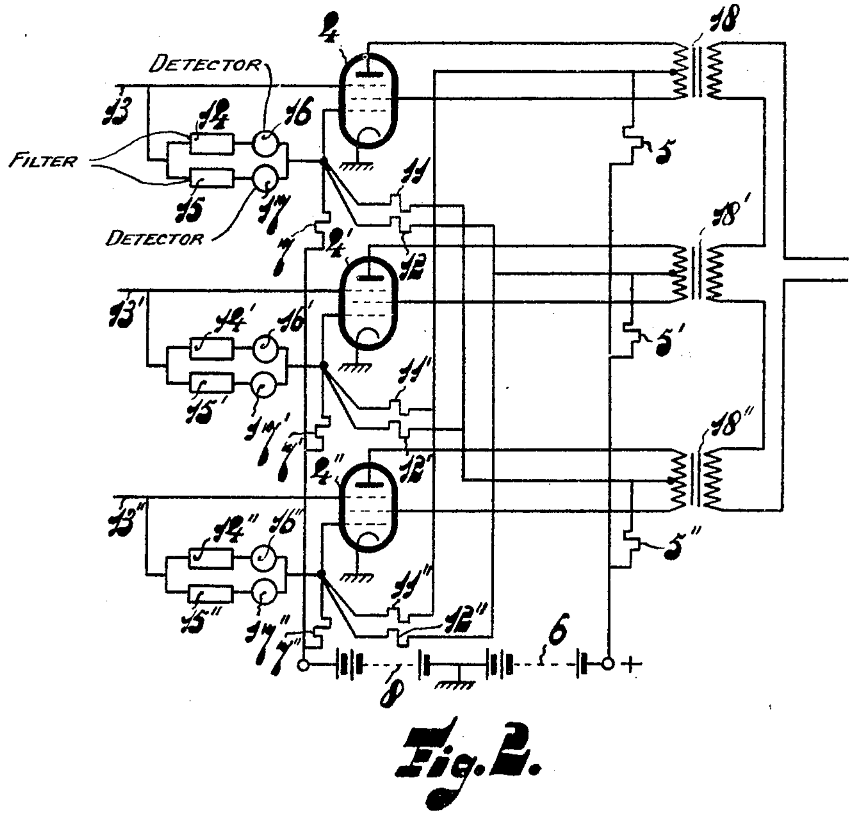
Figure 3:
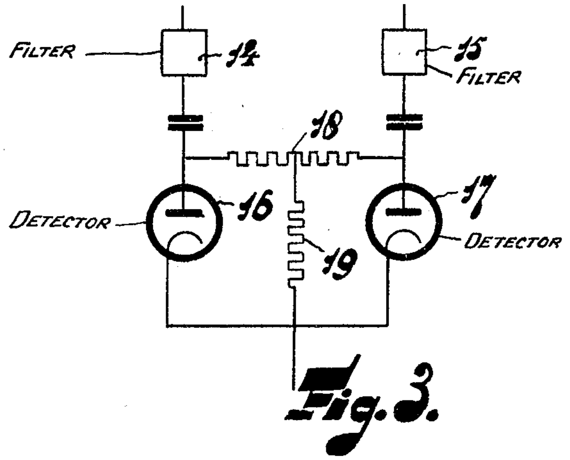

The invention will be explained more fully by reference to the accompanying drawing in which:

Figure 1 is a schematic diagram showing a receiving arrangement according to the invention, Figure 2 is a schematic diagram showing another receiving arrangement according to the invention, and Figure 3 is a schematic diagram showing a comparison circuit for use in the arrangement of Figure 2.

In the receiving plant shown in Fig. 1 three mutually equal receiving devices 1, 1′ and 1″ are used. Each of these receiving devices has taken from it two voltages, viz. a signal voltage, for example the low-frequency signal obtained, after amplification and detection, from the received high-frequency signal and a voltage (control voltage) which is a measure of the strength of the received signal. The signal voltage is taken from a terminal 2 of the receiving device and the control voltage is taken from a terminal 3. Since the two other receiving devices 1′ and 1″ are identical with the receiving device 1 and are also connected in the same manner to the other part of the circuit, we will describe hereinafter only the receiving device 1 and the associated portion of the further circuit. The parts of the circuit which relate to corresponding parts of the receiving devices 1′ and 1″ are indicated by the same reference numerals which are, however, provided with one and with two accents respectively.

The control voltage and the signal voltage are supplied to the first grid and to the third grid respectively of a discharge tube 4; between these two grids is a screen grid which is connected to a positive voltage. The cathode of tube 4 is connected to earth and the anode of the tube is connected, through a resistance 5, to the positive terminal of a source 6 of anode voltage. The first grid is connected, through a resistance 7, to the negative terminal of a source of supply 8, whose positive terminal is earthed. From the anode goes a conductor, via a condenser 9, to a terminal 10 from which the amplified signal voltage may be taken.

The first grid of the discharge tube 4 is connected, in addition, to the anodes of the two other discharge tubes 4′ and 4″ through resistances 11 and 12. Similarly, the first grid of the discharge tube 4′ is connected, via resistances 11′ and 12′, to the anodes of the discharge tubes 4 and 4″, and the first grid of the discharge tube 4″ is connected, via resistances 11″ and 12″, to the anodes of the discharge tubes 4 and 4′.

Owing to the mutual coupling of the tubes with the aid of the resistances 11, 11′, 11″, 12, 12′ and 12″ and by giving the various resistances suitable values, it is possible to obtain an adjustment at which one tube is open and the two other tubes are blocked. This circuit is known per se for two tubes and requires therefore no further explanation. The circuit is applicable, however, to any desired number of tubes.

Now, it depends on the values of the control voltages 3, 3′ and 3″ which of the tubes 4, 4′ or 4″ is released. As a rule, that tube will be opened whose corresponding control voltage has the highest value. Let us just assume that the control voltage 3 has the highest value and that tube 4 is open. The mutual coupling via the resistances 11′ and 11″ now provides for the two other tubes being blocked. Consequently, the signal voltage can be transmitted only by tube 4; the voltage amplified by this tube is set up at the resistance 5 and may be taken from the terminal 10 via the condenser 9.

If, now, one of the other control voltages, for example the voltage 3′, becomes higher than the control voltage 3, there will be a moment when the influence of the control voltage 3′ on the tube 4′ is greater than the influence of the coupling voltage originating from tube 4 via the resistance 11′. At this moment a variation in the circuit takes place, resulting via a labile position of transition in a new stable position of equilibrium, in which new position the tube 4′ is current-conveying and the tubes 4 and 4″ are blocked.

As a rule, the passage from the old condition into the new will take place with some retardation, that is to say the control voltage 3′ will have to be fairly higher than the control voltage 3 before the changing-over takes place. As a rule, this is also desirable for a quiet operation of the circuit.

A changing-over which takes place immediately as the control voltage 3′ is higher than the control voltage 3 may be obtained, if desired, by causing the differences between the control voltages instead of the control voltages themselves to act upon the tubes 4, 4′ and 4″.

In order to enhance the sensitivity of the control voltage to variations in the strength of the received signal and thus to facilitate the adjustment of the circuit, use is preferably made in each of the receiving devices of an automatic voltage control which is determined by the strength of the signal to be transmitted by the circuit and hence by the strength of the signal to be taken from the terminal 10. It is thus ensured that only the control voltage of the receiving device which receives a strong signal assumes a reasonable value and that the other control voltages remain very small.

Fig. 2 shows diagrammatically a circuit of the same kind as that shown in Fig. 1. The circuit is designed for the reception of one side-band signal, wherein one or more control frequencies are also emitted.

The signals originating from the three receivers (not shown in this figure) are incoming at 13, 13′, 13″. These signals may be derived from the received high-frequency signals, for example, by frequency transformation. The (intermediate frequency) signal 13 is supplied not only to the discharge tube 4 but also to a device 14, 15, 16, 17, from which the control voltage is taken. In this device which comprises two filters 14 and 15 and two detectors 16 and 17, the control frequencies emitted with the signal (in the present instance we have reckoned with two control frequencies) are separated from the signal, are rectified and are mutually compared in such manner that only the control frequency of the highest value is transmitted.

Fig. 3 shows how this comparison may take place. The two detectors 16 and 17 are connected in parallel and are mutually connected by means of a resistance 18. The control voltage is now taken from the resistance 18 via a resistance 19; this voltage is determined substantially by the control frequency of the highest value.

The device 14, 15, 16 and 17 may, of course, be housed in the receiver 1.

The circuit arrangement shown in Fig. 2 is identical with that shown in Fig. 1, except that the amplified signal voltage is not taken from the circuit via a condenser 9 but is taken off by means of a transformer 18. The primary winding of the latter is connected, on the one hand, to the anode and, on the other hand, to the screen grid of tube 4. The resistances 5, 11′ and 11″ are connected to a centre tapping of the primary winding. The secondary windings of the transformers 18, 18′ and 18″ are connected in series.

This circuit offers the advantage that even if the switching-over is effected very rapidly, no click occurs in the output signal, since the switching impulse has an opposite effect in the two branches of the transformer and may be compensated by a suitable adjustment of the third grid. If the compensation of the click is not necessary, it is fundamentally possible to interchange the functions of the first and the third grids.

Now, the amplified voltage may be further demodulated and amplified and a control voltage may be taken from the amplified voltage for the automatic volume control and for the automatic frequency correction for the three receiving devices in common.

In the circuits shown in Figs. 1 and 2 the source of the control voltage is connected in parallel with the resistance 7 and the source 8 of direct voltage. It is also possible, however, to connect the source of the control voltage in series with the resistance 7.

What we claim is:

1. In a plural-diversity receiving arrangement for modulated radio signals having a plurality of radio receivers and means to derive separately the signal modulation and a control voltage dependent upon the strength of the signal from each of the said receivers, the circuit comprising a thermionic discharge tube for each of said radio receivers, said thermionic discharge tubes having each a cathode, anode, first and second control grids and a screen grid, means to apply the signal modulation from each of the said receivers to the first control grid-cathode circuit of the respective thermionic discharge tube, means to apply the control voltage to the second control grid-cathode circuit of the respective thermionic discharge tube, output transformer means for each of said discharge tubes, each of said transformer means comprising a winding having one end thereof connected to the said anode and the other end thereof connected to said screen grid and having a tapping, means to couple said anodes to each other, a source of energizing potential, a plurality of resistive means each interposed between said source of energizing potential and the respective tappings, and second resistive means to couple the second control grid-cathode circuit of each of the said discharge tubes to the junction of the tapping and first resistive means of the remaining discharge tubes.

2. In a plural-diversity receiving arrangement for modulated radio signals having a plurality of radio receivers and means to derive separately the signal modulation and first and second control voltages having an amplitude dependent upon the strength of the signal from each of the said receivers, the circuit comprising a thermionic discharge tube for each of said radio receivers, said thermionic discharge tubes having each a cathode, anode, first and second control grids and a screen grid, means to apply the signal modulation from each of the said receivers to the firlst control grid-cathode circuit of the respective thermionic discharge tube, means to select the larger of said first and second control voltages and to apply the same to the second control grid-cathode circuit of the respective thermionic discharge tube, output transformer means for each of said discharge tubes, each of said transformer means comprising a winding having one end thereof connected to the said anode an the other end thereof connected to said screen grid and having a tapping, means to couple said anodes to each other, a source of energizing potential, a plurality of resistive means each interposed between said source of energizing potential and the respective tappings, and second resistive means to couple the second control grid-cathode circuit of each of the said discharge tubes to the junction of the tapping and first resistive means of the remaining discharge tubes.

3. In a plural-diversity receiving arrangement for modulated radio signals having a plurality of radio receivers and means to derive separately the signal modulation and first and second control voltages having an amplitude dependent upon the strength of the signal from each of the said receivers, the circuit comprising a thermionic discharge tube for each of said radio receivers, said thermionic discharge tubes having each a cathode, anode, first and second control grids and a screen grid, means to apply the signal modulation from each of the said receivers to the first control grid-cathode circuit of the respective thermionic discharge tube, means to select the larger of said first and second control voltages and to apply the same to the second control grid-cathode circuit of the respective thermionic discharge tube, output transformer means for each of said discharge tubes, each of said transformer means comprising a primary winding having one end thereof connected to the said anode and the other end thereof connected to said screen grid and having a tapping and comprising a secondary winding, means to couple said secondary windings to each other, a source of energizing potential, a plurality of resistive means each interposed between said source of energizing potential and the respective tappings, and second resistive means to couple the second control grid-cathode circuit of each of the said discharge tubes to the junction of the tapping and first resistive means of the remaining discharge tubes.

EDUARD HERMAN HUGENHOLTZ.
JAN MAXIMILIAAN OLTHUIS.

REFERENCES CITED

The following references are of record in the file of this patent:

UNITED STATES PATENTS

| Number | Name | Date |
|---|---|---|
| 1,916,129 | Schade | June 27, 1933 |
| 1,934,211 | Schroter | Nov. 7, 1933 |
| 2,004,107 | Goldsmith | June 11, 1935 |
| 2,057,857 | Steimcl et al. | Oct. 20, 1936 |
| 2,058,972 | Friedrich | Oct. 27. 1936 |
| 2,067,432 | Beverage | Jan. 12, 1937 |
| 2,249,425 | Hansell | July 15, 1941 |
| 2,253,867 | Peterson | Aug. 26, 1941 |
| 2,364,952 | Crosby | Dec. 2, 1944 |
| 2,384,456 | Davey | Sept. 11, 1945 |
| 2,397,830 | Bailey | Apr. 2, 1946 |
| 2,414,111 | Lyons | Jan. 14, 1947 |
| 2,420,868 | Crosby | May 20, 1947 |